United States Patent
Esswie

(10) Patent No.: US 12,490,262 B2
(45) Date of Patent: Dec. 2, 2025

(54) TRAFFIC CONDITION AWARE SEMIPERSISTENT SCHEDULING

(71) Applicant: Dell Products, L.P., Round Rock, TX (US)

(72) Inventor: Ali Esswie, Montreal (CA)

(73) Assignee: Dell Products L.P., Round Rock, TX (US)

(*) Notice: Subject to any disclaimer, the term of this patent is extended or adjusted under 35 U.S.C. 154(b) by 395 days.

(21) Appl. No.: 17/992,861

(22) Filed: Nov. 22, 2022

(65) Prior Publication Data

US 2024/0172227 A1    May 23, 2024

(51) Int. Cl.
| | |
|---|---|
| *H04W 72/1273* | (2023.01) |
| *H04L 43/087* | (2022.01) |
| *H04W 72/11* | (2023.01) |
| *H04W 72/23* | (2023.01) |

(52) U.S. Cl.
CPC ....... *H04W 72/1273* (2013.01); *H04L 43/087* (2013.01); *H04W 72/11* (2023.01); *H04W 72/23* (2023.01)

(58) Field of Classification Search
None
See application file for complete search history.

(56) References Cited

U.S. PATENT DOCUMENTS

2015/0009881 A1*   1/2015   Yeh ............ H04W 72/30 370/312
2015/0282134 A1*   10/2015   Suzuki ......... H04L 27/2662 370/329
2020/0252168 A1*   8/2020   Kim ............ H04W 72/1268
2022/0361161 A1*   11/2022   Wei ............. H04W 72/046
(Continued)

FOREIGN PATENT DOCUMENTS

| EP | 4 271 086 A1 | 11/2023 |
|---|---|---|
| WO | 2022/148616 A2 | 7/2022 |
| WO | 2023/186481 A1 | 10/2023 |

OTHER PUBLICATIONS

Author Unknown, Considerations on XR jitter handling, Doc. No. R2-211426 pp. 1-8, Nov. 11, (Year: 2022).*

(Continued)

*Primary Examiner* — Christopher M Crutchfield
(74) *Attorney, Agent, or Firm* — Amin, Turocy & Watson, LLP

(57) ABSTRACT

A radio access network node determines a change in condition of traffic directed to a user equipment. The condition change may comprise jitter caused by a core network component or the condition change may comprise lack of traffic to transmit to the user equipment. The node may determine an offset to compensate for the jitter and transmit the offset to the user equipment, to be used by the user equipment to modify previously-scheduled semipersistent scheduling occasions. The node transmits the jitter-altered downlink traffic according to semipersistent scheduling occasions that have been modified by the offset. If no traffic data is present at the node to transmit to the user equipment, the node may transmit an activate/deactivate indication to be used by the user equipment to deactivate monitoring of a previously-scheduled semipersistent scheduling occasion or to activate monitoring of a different occasion resource.

20 Claims, 14 Drawing Sheets

(56) References Cited

U.S. PATENT DOCUMENTS

| | | | |
|---|---|---|---|
| 2023/0007673 A1* | 1/2023 | Yao | H04W 72/23 |
| 2024/0073895 A1* | 2/2024 | Wong | H04L 1/1628 |
| 2024/0172231 A1* | 5/2024 | Wong | H04W 76/20 |
| 2025/0007556 A1* | 1/2025 | Liu | H04B 7/0626 |

OTHER PUBLICATIONS

Technical specifications (TS) 38.201—"5G; NR; Physical layer; General description", 3GPP TS 38.201 version 15.0.0 Release 15, Sep. 2018, 14 pages.
Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
International Search Report and Written Opinion for PCT Application No. PCT/US2023/034404 mailed Jan. 26, 2024, 19 pages.
Qualcomm Incorporated: "Capacity Enhancement Techniques for XR", 3GPP Draft; RI-2207254, 3GPP TSG RAN WG1 #110, Aug. 12, 2022 [https://ftp.3gpp.org/tsg_ran/WG1_RL1/T SGRI_110/Docs/RI-2207254.zip] 12 pages.
Sony: "Considerations on capacity enhancements techniques for XR", 3GPP Draft; R1-2203745, Apr. 29, 2022, 3GPP TSG RAN WGt #109-e, [https://ftp.3gpp.org/tsg_ran/WG1_RL1/T SGR1_109-e/Docs/RI-2203745.zip].
Notification Concerning Transmittal of International Preliminary Report on Patentability mailed Jun. 5, 2025, 12 pages.
European Office Action mailed Jul. 1, 2025 for European Patent Application No. 23806407.5, 3 pages.

* cited by examiner

| Two-bit SPS timing offset indication ← 405 | SPS configuration sets to be monitored ← 410 | Timing offset (in ms, OFDM symbols, mini-slots, slots, frames, etc.) ← 415 |
|---|---|---|
| 00 | Set I, Set J | $x_1$ |
| 01 | Set I | $x_2$ |
| 10 | Set J | $x_3$ |
| 11 | Set J | $x_4$ |

TRAFFIC CONDITION AWARE SEMIPERSISTENT SCHEDULING

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises, based on a change in condition of downlink traffic, determining, by a radio access node ("RAN") that comprises a processor, a scheduling change of a scheduled downlink semipersistent scheduling ("SPS") resource element previously allocated to, or scheduled for use in transmitting traffic data to, a user equipment ("UE"); transmitting an indication of the scheduling change to the user equipment; and transmitting traffic to the user equipment according to the scheduling change. The indication of the scheduling change may comprise a offset indication or an activate/deactivate/null indication. In an embodiment, the example method may comprise determining a jitter associated with the change in condition of the downlink traffic, wherein the indication of the scheduling change comprises an offset to a first semipersistent schedule resource element. The jitter may be induced by interference, by latency caused by a core network component, or by delay caused by another source. The offset may comprise a time offset. The offset may comprise a frequency offset or the offset may comprise a timed offset.

In an embodiment, the transmitting of the indication of the scheduling change may comprise transmitting the indication of the scheduling change in a scheduled control channel resource element that may have been transmitted as an SPS configuration before the RAN determined the change in traffic condition.

The indication of the scheduling change may be an activate/deactivate/null indication that comprises a deactivation instruction to deactivate the first semipersistent schedule resource element, wherein the indication of the scheduling change comprises an activation instruction to activate a second semipersistent schedule resource element. In an embodiment, the second semipersistent schedule resource element may be offset with respect to the first semipersistent schedule resource element in terms of time or in terms of frequency.

In an embodiment, the indication of the scheduling change may be scrambled with a device-specific or a device group-specific scrambling code. Thus, only a UE device, or group of UE devices, to which downlink traffic buffered at the RAN is directed can decode the scheduling change indication. In an embodiment the indication of the scheduling change may be transmitted in a codebook of at least one jitter indication indicating a semipersistent schedule time offset and at least one corresponding semipersistent schedule resource element.

In an embodiment, the indication of the scheduling change may comprise a no-traffic indication corresponding to a null scheduled semipersistent schedule resource element indicating that the user equipment is to refrain from decoding the null scheduled semipersistent scheduling element. This may amount to an instruction for the UE to which the lack of traffic corresponds to enter a sleep mode for an amount of time, or corresponding scheduled SPS occasions that the scheduling change indication indicates that UE is to skip monitoring and decoding. The indication of the scheduling change may indicate only to refrain from decoding the null scheduled semipersistent schedule resource element of multiple scheduled semipersistent schedule resource elements. After time corresponding to the indicated occasions to be skipped has passed the UE may resume monitoring and decoding configured SPS resources without receiving a further SPS indication.

In an embodiment the indication of the scheduling change may scrambled according to a device-specific semipersistent scheduling scrambling code, or sequence, or a device-group-specific semipersistent scheduling scrambling code, or sequence.

In another embodiment, a radio access node of a communication network, comprises a processor configured to: determine a traffic condition change corresponding to a change in a condition of traffic applicable to a user equipment; determine a scheduling change, based on the traffic condition change, of a scheduled semipersistent scheduling resource occasion corresponding to the user equipment; transmit a scheduling change indication indicating the scheduling change to the user equipment; and transmit traffic to the user equipment according to the scheduling change. The traffic change may be due to jitter or lack of traffic for a UE currently scheduled to monitor and decode downlink traffic according to an SPS resource, or resource set.

The processor of the radio access node may be further configured to determine a jitter associated with the traffic condition change to result in a determined jitter, wherein the scheduling change indication comprises an offset to a first semipersistent schedule resource occasion, wherein the offset corresponds to the determined jitter. The scheduling change indication may comprise a deactivation instruction to deactivate a first semipersistent schedule resource occasion, wherein the scheduling change indication comprises an activation instruction to activate a second semipersistent schedule resource occasion, and wherein the second semipersistent schedule resource occasion is offset with respect to the first semipersistent schedule resource occasion. The offset may comprise an offset with respect to time or an offset with respect to frequency.

The processor of the radio access node may be further configured to transmit a jitter indication configuration comprising at least one jitter indication indicating at least one corresponding semipersistent schedule timing offset, wherein the scheduling change indication comprises a jitter indication to be used by the user equipment to determine, from the jitter indication configuration, a semipersistent schedule timing offset of the at least one corresponding semipersistent schedule timing offset to result in a determined semipersistent schedule timing offset to be used to process downlink traffic received from the radio access node. The jitter indication configuration may be part of a codebook for use by a user equipment for determining the offset based on an indication code, such as a two-bit code. The scheduling change indication comprises a no-traffic indication corresponding to a null scheduled semipersistent scheduling resource occasion instructing the user equipment not to attempt to decode the null scheduled semipersistent scheduling resource occasion. The scheduling change indication comprises an indication of multiple upcoming semipersistent scheduling resource occasions to be used by the user equipment to receive future downlink traffic.

In yet another embodiment, a non-transitory machine-readable medium may comprise executable instructions that, when executed by a processor of a network node of a communication network, facilitate performance of operations that may comprise determining a jitter associated with a downlink traffic condition change to result in a determined jitter; scheduling a change to a scheduled downlink semipersistent scheduling occasion allocated to a user equipment based on the determined jitter; determining a scheduling change indication that comprises an offset applicable to a first semipersistent schedule occasion, wherein the offset is based on the determined jitter; transmitting the scheduling change indication indicating the change to the user equipment; and transmitting traffic to the user equipment according to the change. The scheduling change indication comprises a deactivation instruction to deactivate the first semipersistent schedule occasion, wherein the scheduling change indication comprises an activation instruction to activate a second semipersistent schedule occasion, and wherein the second semipersistent schedule occasion is offset with respect to the first semipersistent schedule occasion based on the offset. The scheduling change indication may be anonymized using a device-specific code or a device group-specific scrambling code.

BRIEF DESCRIPTION OF THE DRAWINGS

FIG. 4 illustrates example offset semipersistent schedule resource element information shown as a codebook table.

DETAILED DESCRIPTION OF THE DRAWINGS

Figure 1:
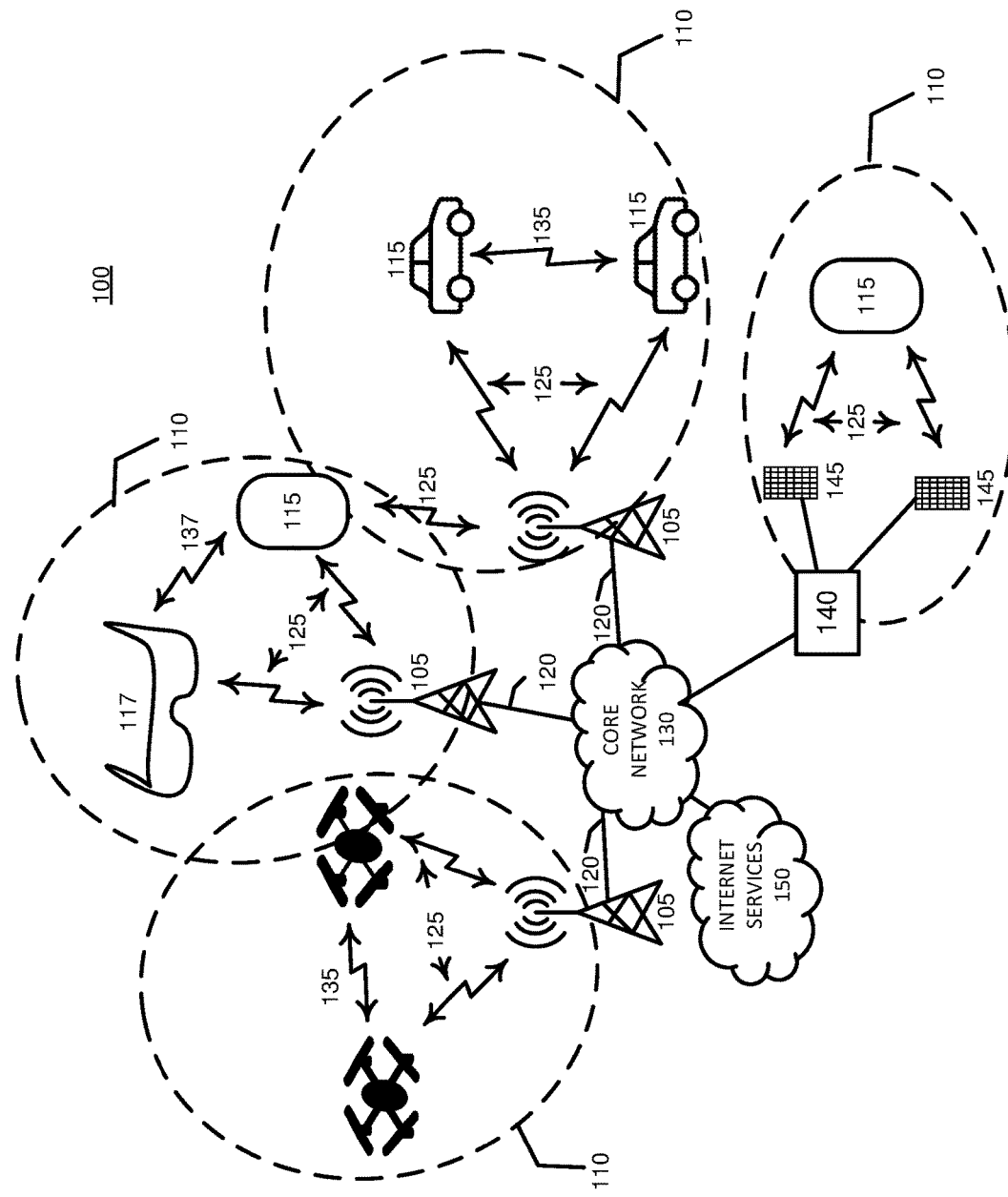
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

The PDCCH of a 5G NR system may deliver downlink and uplink control information to cellular devices. Compared to the control channel design of the fourth generation (e.g., LTE), the 5G control channel can match requirements of the URLLC and eMBB use cases and can offer an efficient coexistence between those different QoS classes.

The 5G PDCCH channel, unlike the Fourth Generation control channel, may be beamformed using favored-channel vectors of each UE, with embedded demodulation-assisting demodulation reference signals ("DMRS"). The PDCCH may be modulated by a fixed QPSK modulation scheme and with a conservative coding rate such as the reliability of receiving the PDCCH channel at a UE device is maximized. For example, to satisfy a URLLC 10e-5 reliability level, the PDCCH channel decoding ability may be enhanced at the device end.

The resource size of each PDCCH channel, which may be carrying the downlink control information ("DCI") of one or more UEs, may be time-varying, and may be referred to as PDCCH aggregation level. In particular, and to enhance PDCCH decoding, the network may increase the resource size of the PDCCH channel and accordingly adopt a more conservative and resource-less-efficient coding rate of the PDCCH. This implies that same amount of PDCCH control information is transmitted with a stronger coding rate (i.e., more redundant bits for error detection and correction) at the expense of consuming more channel resources for transmitting the PDCCH information.

There are two types of PDCCH channels. First, the UE-specific PDCCH, where a set channel resources are periodically monitored by a single UE/device. After being configured, the device will attempt to blindly decode those candidate resources in case they may be potentially carrying DCI information. This DCI information includes configurations on scheduled uplink or downlink grants, transmission configurations, and information on common system signaling and updates. Furthermore, the blind decoding is the process when the UE attempts decoding the DCI with all possible transmission configurations and aggregation levels. This implies a heavy power consumption on the device end; however, it is necessary because the UE is not yet aware about the actual configurations of the PDCCH channel and corresponding transmissions. It shall be aware of such after it successfully decodes the PDCCH. In the active mode, the UE may monitor the configured one or more PDCCH search spaces, where a search space implies a set of candidate resources that may carry the PDCCH/DCI information. The search space definitions may be used to refer to varying size of the PDCCH channel (i.e., aggregation levels) and hence, the required size of resources to carry the PDCCH may vary.

Common PDCCH search spaces are monitored by all UEs. Those common PDCCH channels typically carry DCI information that are relevant to all devices. Examples include system updates and control information, all-UE power control information, and general system information.

For each scheduled downlink or uplink transmission, there typically is a preceding PDCCH control transmission informing the UE device about resources scheduled by the network for the transmission, and transmission configurations to use for transmission in the uplink or reception in the downlink. Accordingly, the PDCCH transmissions are considered as signaling overhead, which should be always minimized, and needed for successful device transmission and/or reception.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to 5 Mbps URLLC link with a 1 ms radio budget, some XR applications need 100 Mbps links with couple of milliseconds of the allowed radio latency. Thus, 5G radio design and associated procedures may be adapt to the new XR QoS class and associated targets.

XR service may be facilitated by traffic having certain characteristics associated with the XR service. For example, XR traffic may typically be periodic with time-varying packet size and packet arrival rate. In addition, different packet traffic flows of a single XR session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

High-capacity-demanding services, such as virtual reality applications, may present performance challenges to even 5G NR capabilities. Thus, even though 5G NR systems may facilitate and support higher performance capabilities, the radio interface should nevertheless be optimized to support extreme high capacity and low latency requirements of XR applications and XR data traffic. Semi-persistent scheduling ("SPS") may be used to support high-capacity-requirement traffic without consuming too much control channel overhead. Using SPS, the radio access network can allocate active user equipment devices a set of periodic data resources without dynamically transmitting individual control channel information corresponding to each data resource, or resource element. Thus, SPS implementations typically lead to less control overhead being used compared to scheduling every resource as well as optimized power saving gain at user equipment devices, since user equipment devices only data channel resources scheduled according to SPS scheduling scheme without having to perform repeated blind decoding of control channels to determine scheduling of data channel resources.

However, since arrival times of data traffic destined to a user equipment is not known in advance, the radio access network node ("RAN") typically configures devices with multiple SPS resource scheduling sets, for example, with various resource occasions and different periodicities, such that when a traffic payload portion arrives at a RAN, the network may transmit the traffic payload portion during the first-available SPS resource time/occasion. However, packet arrivals of virtual reality traffic may exhibit time-varying jitter, for example due to application-specific entities of the core network or varying traffic volume. The RAN may configure SPS resource set configurations with different starting time instants to reduce the traffic buffering latency. Although such scheduling of multiple SPS resource sets may alleviate performance degradations due to jitter, a user equipment may attempt to monitor and to decode many data channel resources that may not correspond to the user equipment (e.g., contain traffic data directed to the user equipment), which typically leads to poor power consumption performance of the user equipment (e.g., inefficient use of the UE's battery charge). Thus, power-efficient, low latency SPS scheduling, as disclosed herein, facilitates high-capacity-demanding services. Power-efficient and latency-minimizing SPS scheduling techniques disclosed herein include dynamically offsetting SPS resource sets based on changes of downlink traffic due to jitter, and activation/deactivation of scheduled SPS resources to save the device power consumption at a user equipment by instructing the user equipment to skip monitoring and attempting to decode scheduled SPS resources that contain no incoming traffic for the user equipment.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB) a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1, 4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking. Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that mutes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet. Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions. P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various M IMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
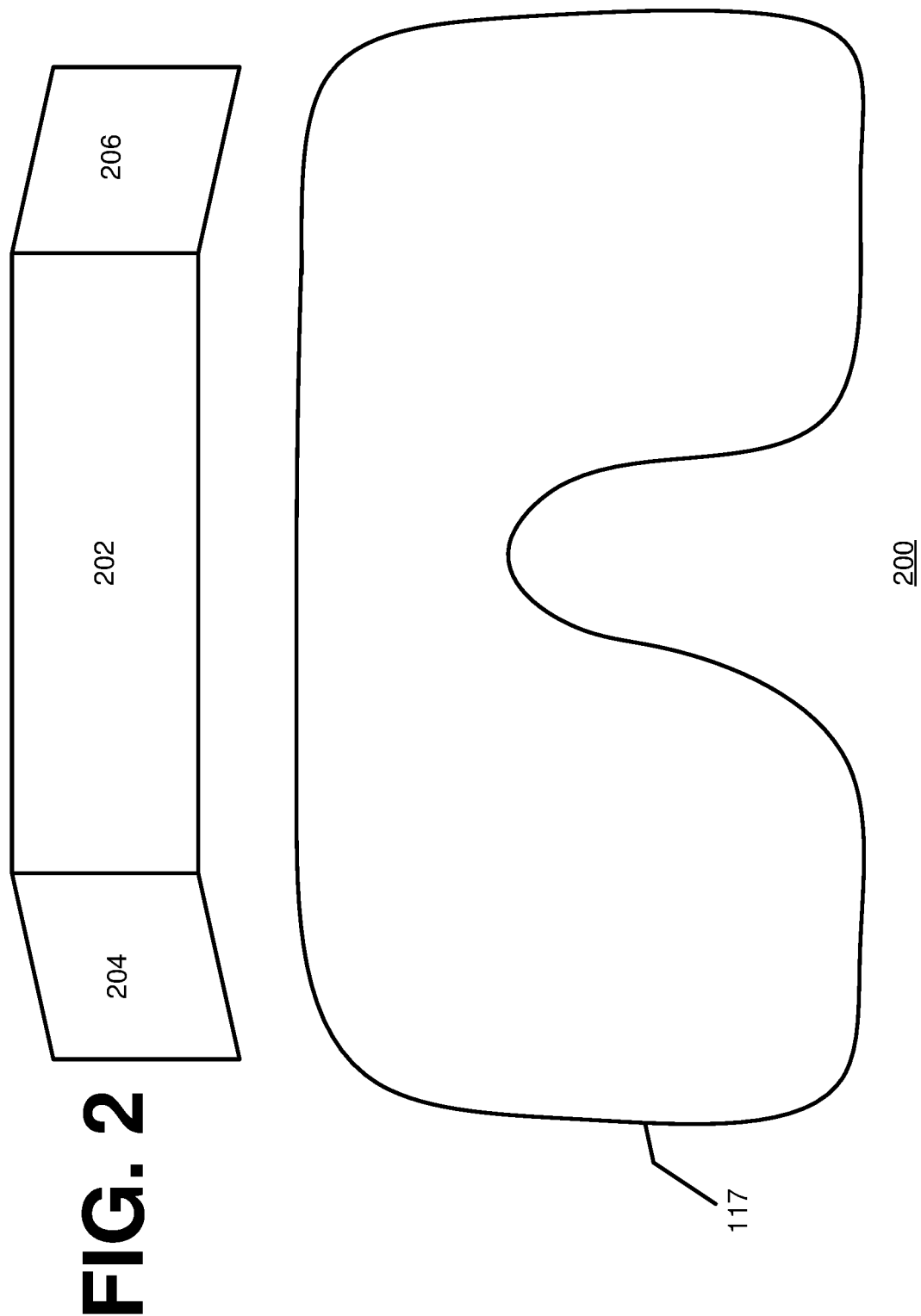
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5-G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing XR services may be at least partially determined according to satisfaction of users of the XR services. Each XR-service-using user may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

Semi-Persistent Scheduling ("SPS").

SPS scheduling enables the network to allocate channel resources to active devices for future flow of traffic without the need to transmit a control channel information for each resource occurrence. For example, with a single control channel transmission, the RAN can configure a device with multiple future resource occasions, which are repeated periodically, over which potential traffic data directed to the device is transmitted. Furthermore, the data transmitted over the SPS data resource occasions may be transmitted with a preconfigured and predetermined transmission configurations including a selected modulation and coding scheme ("MCS").

Accordingly, devices attempt decoding the configured SPS data channel resources. The network/RAN may utilize channel resources scheduled for a given user equipment for other device transmissions if there is not any traffic at the RAN that is to be transmitted to a given user equipment during the SPS channel occasion, which enhances overall network spectral efficiency. Thus, in such a scenario case, the given user equipment device should fail decoding received payload over configured, scheduled SPS resource occasions because the traffic is not destined to the given user equipment device. Such decoding failure can lead to noticeably poor battery performance at the user equipment.

With high-capacity-demanding services or applications, such as virtual reality, the traffic typically arrives at the RAN node with an approximate periodicity (e.g., the traffic flows at a somewhat predictable steady rate). Therefore, adjusting the SPS resource periodicity to match the incoming traffic arrival rate to reduce traffic buffering time may result in satisfactory performance. However, jitter may vary as compared to an overall traffic flow rate of virtual reality traffic. Accordingly, concepts, aspects, examples, and embodiments disclosed herein facilitate improvements in latency and power-efficiency performance with scheduled SPS resources with respect to application-specific, or service-specific, jitter associated with virtual reality application and services.

SPS scheduling enables a network RAN to allocate future and periodic data resources for devices without the need for preceding control channel transmission prior to each data resource. For periodic traffic, where the network matches the SPS resource periodicity with the traffic arrival periodicity, SPS scheduling may be efficient in reducing control channel overhead and corresponding device processing burdens. However, for use cases such as virtual reality services, application-specific or service/specific jitter, which is typically time-varying (e.g., changing), can disturb periodicity of traffic arriving at the RAN. This can lead to SPS configurations being mismatched to traffic arrival rate and accordingly result in degraded spectral efficiency and increased traffic buffering at a RAN due to the time varying nature of jitter of associated with traffic arriving at a RAN. Poor battery performance of a user equipment may be attributed to SPS-configured user equipment devices attempting to decode configured SPS resource occasions that do not contain downlink traffic destined towards them, thus wasting device battery and processing power.

Currently, user equipment devices are configured with SPS configurations that are determined independent of the real-time jitter variations, which may occur with respect to virtual reality use cases. This may result in user equipment monitoring multiple SPS resource occasions or frequencies that contain no traffic for the user equipment, inefficiently consuming more device battery. As disclosed herein, dynamically time offsetting configured SPS resource occasions or frequencies depending on changes in traffic conditions, for example the real time jitter, facilitates user equipment devices avoiding attempts to decode SPS resources that do not contain traffic destined for them, and accordingly, facilitating reducing, or eliminating, decoding failure and concomitant wasted battery power consumption. Concepts, aspects, examples, and embodiments disclosed herein facilitate dynamically and adaptively change SPS resource configurations according to traffic condition changes, such as traffic conditions that may be due to jitter.

Dynamic Semi-Persistent Scheduling Time Offsetting.

Due to jitter in the traffic arrivals at the RAN node, the network typically configures multiple SPS occasions that start at different relative times. Thus, when a latency-critical SPS traffic portion arrives late relative to a scheduled active SPS occasions, the network does not have to buffer this traffic until the next occurrence of this SPS occasions. Instead, the network transmits the buffered SPS traffic over the next available SPS resource occasion. However, SPS devices will have to monitor, receive and attempt decoding more SPS occasions, leading to a poorer power saving performance. Thus, as disclosed herein, a dynamic indication of adaptive time offset per each active single or group of SPS occasions facilitates shifting, or 'rescheduling' one or more SPS resource elements (e.g., time or frequency). Based on a real-time jitter determined by a RAN, the RAN may transmit a control channel indication towards one or more user equipment devices configured with SPS resource elements to indicate a timing offset of one or more of the upcoming configured SPS occasions. The network may avoid configuring many SPS resource occasions, which may result in the one or more user equipment devices monitoring fewer SPS resource occasions (e.g., instead configuring more SPS resource occasions to handle jitter-affected traffic, fewer SPS resources are scheduled with each one being more likely to contain the jitter-affected traffic) while still efficiently receiving latency-critical traffic.

A control channel carrying the SPS timing or frequency offset indications can be scrambled with a device-specific scrambling code. In an embodiment, a control channel can be scramble an SPS offset indication with a device group-specific scrambling code, and accordingly one or more SPS device can receive a timing offset indication. A timing offset indication implies a timing offset of a certain group of upcoming SPS resource occasions, where the offset can be in terms of milliseconds, mini-slots, slots, subframes, or frames. In an embodiment, a RAN may broadcast or multicast a codebook of SPS timing indications wherein an index or row is associated with a certain timing offset and one or more SPS occasions.

Figure 3:
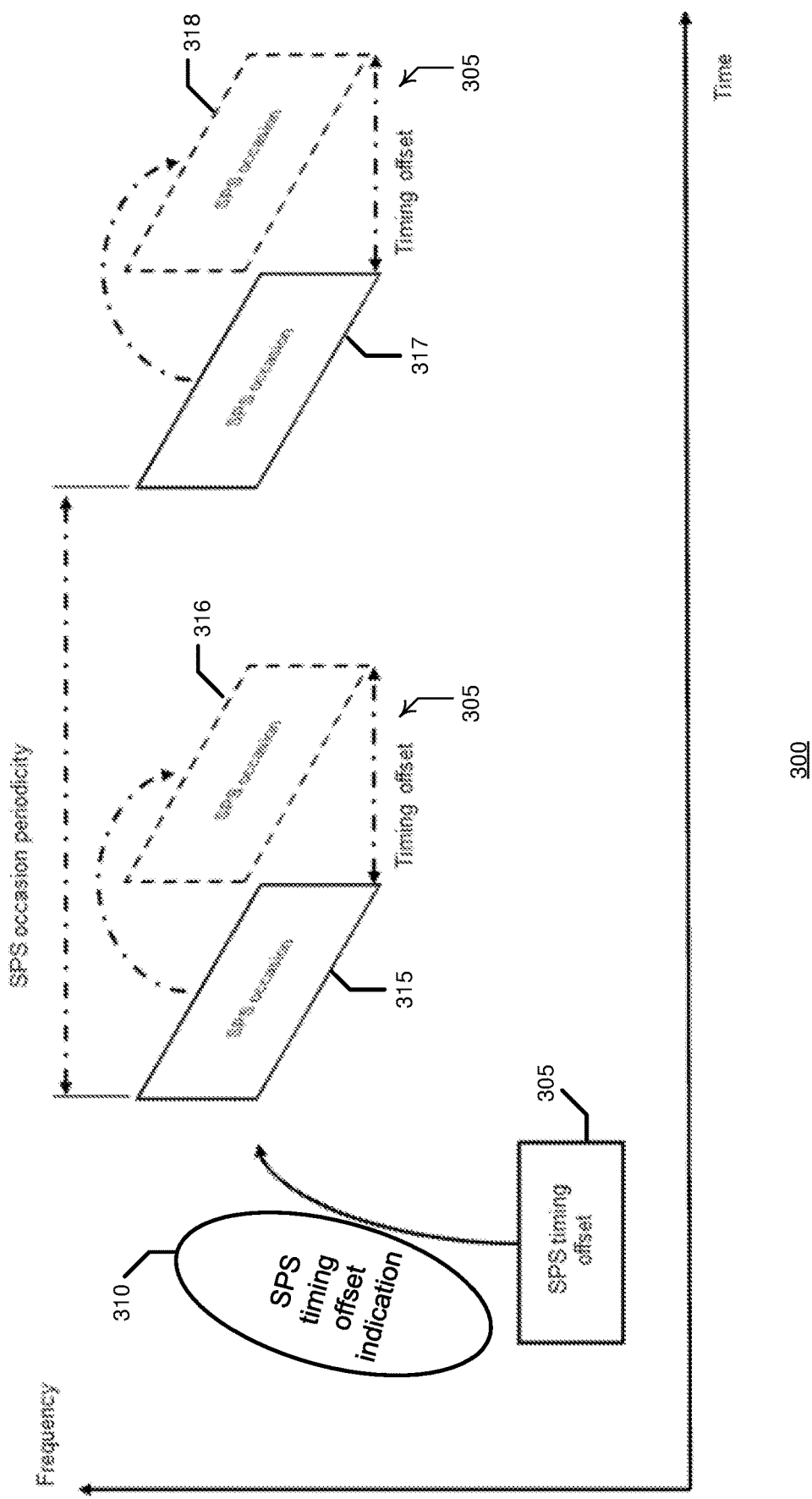
FIG. 3 illustrates offset semipersistent schedule resource elements to minimize performance degradation due to jitter.

Turning now to FIG. 3, the figure illustrates an example offset semipersistent scheduling 300 of resource elements to minimize performance degradation due to jitter. An SPS timing offset 305 may be transmitted in an offset indication 310 to a user equipment from a RAN serving the user equipment. SPS offset indication 310 may be transmitted via an SPS control channel resource that may comprise control channel resources dedicated for SPS-specific control channel information and indications. SPS control channel resource(s) can be monitored and decoded by a single user equipment or a group of active user equipment devices that is/are configured to receive downlink traffic according to an SPS configuration. Therefore, SPS timing offset indications 310 may be scrambled by a pre-configured SPS device-specific or device-group-specific scrambling code, assigned from the RAN node to the active SPS devices. Accordingly, user equipment devices may decode the configured SPS control channel, determine indicated timing offset 305, and determine to which SPS resource occasions the offset be applied. For example, a single timing offset 305 contained in offset indication 310 can be associated with multiple future active SPS resource occasions 315 and 317, resulting is offset occasions 316 and 318, respectively. In another example, a signal timing offset can be applied to only one SPS resource—for example offset 305 could be applied to SPS occasions 317 to result in offset occasion 318, without being applied to SPS occasion 315 (in which case offset occasion 316 would not be scheduled). Timing offset 305 can be configured in terms of milliseconds, or number of OFDM symbols, mini-slots, slots, or frames, thus offering an adaptive SPS timing adjustment to different levels of packet arrival jitter at a serving RAN.

Upon decoding SPS offset indication 310, a user equipment may offset the starting times of SPS resource occasions 315 and 317, and accordingly avoid monitoring and decoding these now previously-scheduled SPS resources—due to indicated timing offset 305, there will not be traffic available for transmission and reception according to the former SPS timing resources.

As shown by the example in FIG. 4, a network node/RAN may configure user equipment devices with a list or a codebook 400 of SPS occasion timing offset indications 405 with each being associated with respective timing offsets 415 (such as offsets 305 as described in reference to FIG. 3) and which may be applied to an indicated one or more SPS active resource occasion corresponding to resource sets 410. The SPS timing offset codebook and configurations can be indicated to user equipment devices using radio resource control ("RRC") connection establishment signaling, downlink control information ("DCI"), or part of the SPS control information. Accordingly, during an active SPS scheduling lifetime (e.g., configuration sets 410, which are visually represented as occasions 315 and 317 in FIG. 3, as well as sequential occasions that may follow but that are not shown in FIG. 3), based on real time experienced jitter, a RAN may transmit in an SPS control channel a selected timing offset indication towards one or more active SPS devices, where the offset indication may be determined by the RAN such that the offset 415 compensates for the detected jitter (e.g., application-layer-induced jitter).

In an example, a scheduling change indication 310 shown in FIG. 3 may comprise an offset indication, such as '01' shown as cell 405B in table 400 of FIG. 4, associated with SPS resource set 'J' shown in cell 410B NS associated with offset '$x_2$' shown in cell 415B (offset $x_2$ may correspond to offset 305 shown n FIG. 3). Thus, if a user equipment receives a scheduling change indication 310 and decodes the scheduling indication according to a device-specific scrambling code, the user equipment may delay monitoring previously scheduled occasions 315 and 317 by an amount specified by $x_2$ such that instead the user equipment monitors downlink traffic data during occasions 316 and 318, respectively, wherein occasion 315 and offset occasion 316 are separated by offset $x_2$ and occasion 317 and offset occasion 318 are also separated by offset $x_2$. Similarly, if a scheduling change indication comprises "10", different scheduled SPS occasions (instead of occasions 315 and 317) not shown in FIG. 3, a user equipment would delay monitoring and decoding the scheduled SPS occasions by $x_3$, or if the scheduling indication comprises "11" the user equipment would delay monitoring and decoding the SPS occasions (which are not shown in FIG. 3) by an offset with respect to time (or other measurement unit) of $x_4$. If a scheduling change indication 310 comprises and offset 305 as shown in FIG. 3 of "00" as shown in FIG. 4, two different sets of scheduled SPS resource occasions, offsets $x_4$ would be applied by a user equipment to monitoring and decoding of resources of set I and set J as shown in cell 410A.

Figure 5:
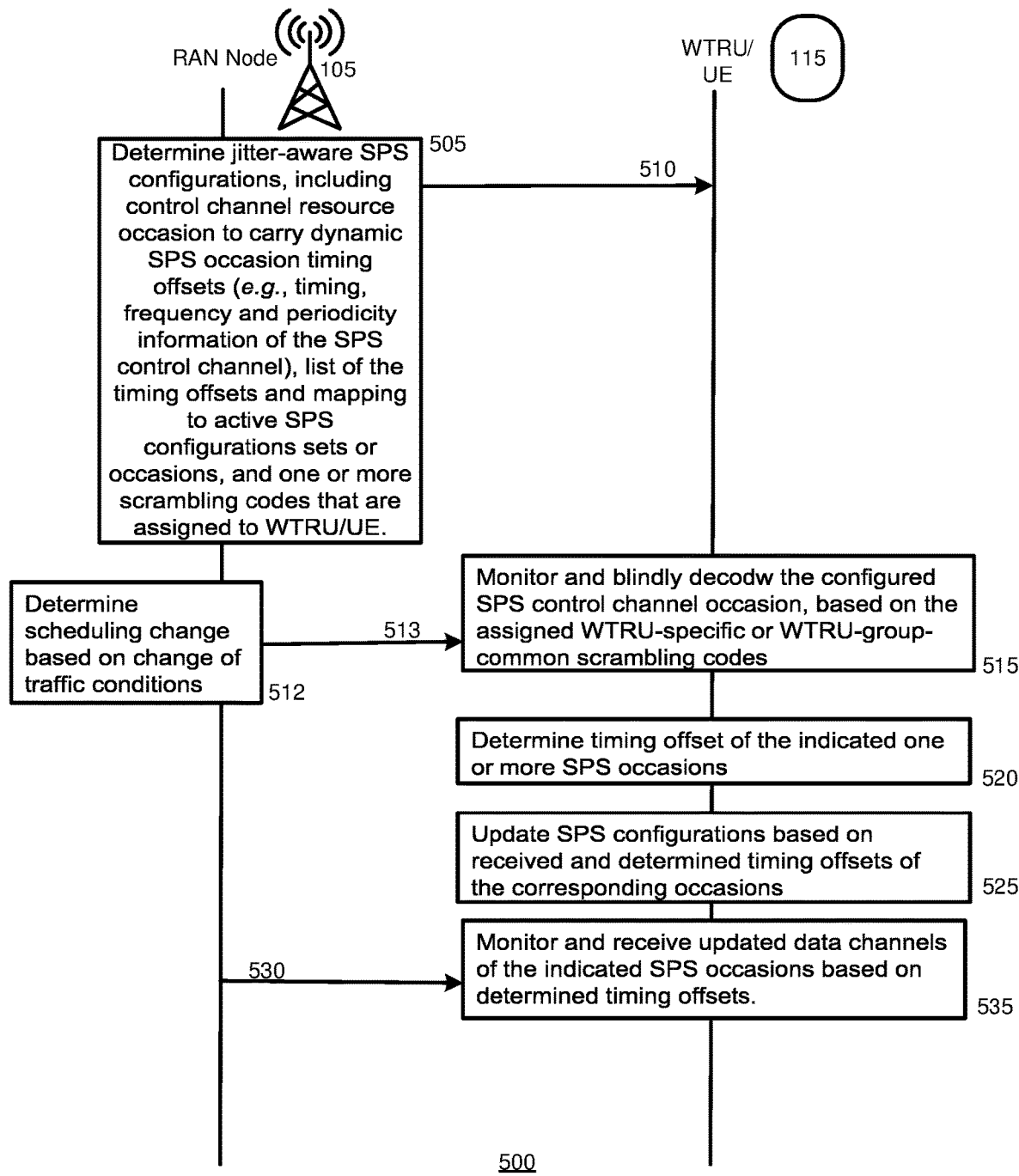
FIG. 5 illustrates a timing diagram of an example method embodiment to offset semipersistent schedule resource elements to minimize effects of jitter.

Turning now to FIG. 5, the figure illustrates a timing diagram 500 showing acts to configure a UE 115 with offset semipersistent resource elements, which may include timing/occasion resources or frequency resources. At act 505 serving RAN 105 may determine a jitter-aware semi persistent scheduling configuration and transmit the jitter-aware SPS configuration to UE 115 at act 510. The jitter-aware SPS configuration may comprise a control channel resource occasion to carry dynamic SPS occasion timing offsets (e.g., timing, frequency or periodicity information of the SPS control channel), a listing associated timing offsets, and a mapping of the associated time offsets to active SPS configurations sets or occasions. The jitter-aware SPS configuration transmitted at act 510 may comprise one or more scrambling codes that are assigned to the UE/WTRU 115 (the scrambling code, or codes, may be device-specific or specific to a group of devices that comprises UE 115). At act 512 RAN 105 determines change of traffic condition and a change to scheduled SPS occasions based thereon and transmits at act 513 an indication of the determined scheduling change to UE/WRTU 115 in a control channel occasion, or occasions, that may have been configured by the configuration transmitted at act 510. At act 515, UE/WTRU 115 monitors and blindly decodes the configured SPS control channel occasion(s) based on an assigned WTRU-specific or WTRU-group-common scrambling codes. At act 520 UE/WTRU 115 determines a timing offset of one or more SPS occasions based on the scheduling change indication received, monitored, and decoded at act 515. At act 525 UE/WTRU 115 updates its SPS configuration(s) based on the timing offsets determined at act 520. At act 530 RAN 105 transmits downlink traffic to UE/WTRU 115 via SPS occasions that have been offset according to offsets indicated in a control channel occasion transmitted from the RAN at act 513 and decoded by UE 115 at act 515. At act 535 UE/WTRU monitors and receives downlink traffic transmitted from RAN 105 at act 530 according to data channel occasions corresponding to offset SPS occasions based on timing offsets determined at act 520.

Adaptive SPS Configuration Activation.

User equipment device may be configured to monitor SPS resource occasions. In case there are not any traffic data arrivals directed to a user equipment, or directed to a group of user equipment, configured to receive traffic via SPS occasions, a RAN serving the user equipment may utilize the SPS resources for other for delivery of traffic via resources not configured for SPS delivery. However, a user equipment configured for receiving traffic via SPS scheduled resource typically monitors configured SPS recourses for traffic directed to the user equipment availability, and accordingly, may attempt decoding a full SPS occasion data resource set, which can lead to poor battery performance. Thus, as disclosed herein, a dynamic indication, which may comprise a null indication, or a deactivation indication, directed to a user equipment configured for SPS traffic reception, or for a device group configured to received traffic via SPS-scheduled resources, facilitates the user equipment in identifying whether there is traffic incoming over one or more configured upcoming SPS resource occasions. Therefore, SPS-configured user equipment devices can avoid attempting to decode an SPS data channel resource set if the SPS traffic indication implies that no SPS traffic is available during current SPS occasion. The proposed null or deactivation indication may be transmitted over a limited control channel resource, wherein the indication is scrambled according to a device-specific, or a device-group-specific SPS scrambling code or sequence. The SPS activate/deactivate indication can be associated with multiple scheduled SPS resource occasions. Thus, the SPS null/deactivation indication can indicate the availability of SPS traffic over multiple future SPS occasions for an SPS device or group of devices, and effectively, dynamically activate those SPS occasions for monitoring and reception by a user equipment while deactivating SPS occasions that will not contain traffic directed to the user equipment.

As disclosed and described above, jitter-aware SPS scheduling may configure SPS occasions with different starting timing using an offset determined based on jitter, thus, reducing the traffic buffering delay. In addition, as discussed above, current techniques aimed at reducing jitter-induced buffering delay may configure many multiple SPS occasions with many different starting times to facilitate a reduction in buffering delay caused by the jitter. Although the jitter-aware embodiments disclosed and described herein reduce buffering delay relative to current techniques, a user equipment configured with to monitor SPS resources, even when a jitter-based offset is applied, may attempt decoding an SPS resource set that does not comprise downlink traffic data directed to the user equipment. This typically may result in poor battery power performance.

In addition to, or as a standalone embodiment, a dynamic activate/deactivate indication may be generated and transmitted from a serving RAN to a UE that comprises scheduling information corresponding to currently active, currently scheduled SPS resource occasions (e.g., resource elements, such as timing or frequency resources which the UE has been configured, or scheduled, to use for downlink traffic).

Figure 6:
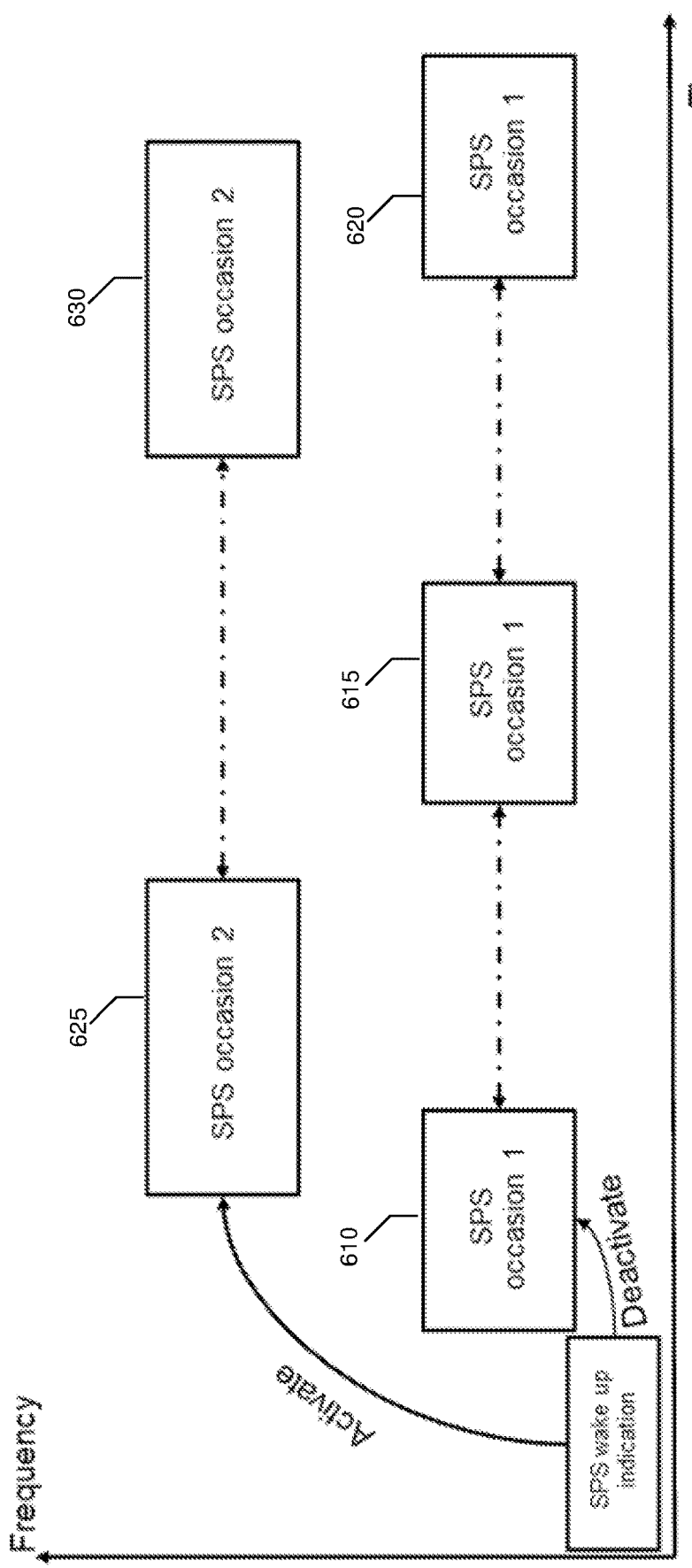
FIG. 6 illustrates an example embodiment of adaptive SPS configuration activation and deactivation of semipersistent schedule resource elements based on changes to traffic to be transmitted to a user equipment.

As shown in FIG. 6, a control channel may carry an SPS occasion, or an SPS group-occasion activate/deactivate indication. The SPS activate/deactivate indication may indicate to devices that are monitoring the SPS control channel, one or more SPS occasions, from the active, a currently scheduled SPS occasion set, to activate (e.g., occasions 625 or 630) or which occasions to deactivate (e.g., occasions 610, 615, 620). Thus, a user equipment, upon decoding a transmitted SPS activation/deactivation indication, may monitor and attempt decoding of received SPS traffic over activated SPS occasions indicated by indication 605. A UE device may skip monitoring and decoding of configured SPS occasions that are not dynamically activated according to SPS activation indication 605, thus resulting in a power saving gain of the user equipment's battery, since the user equipment becomes aware, based on indication 605, that network will not transmit SPS traffic directed to the user equipment, or directed to an SPS multicast group of devices to which the user equipment is a member. Similar to the SPS timing offset codebook 400 described in reference to FIG. 4, an SPS occasion activate/deactivate codebook 700, or list, shown in FIG. 7 may be used to facilitate configuration of a user equipment based on an indication received in indication 605 shown in FIG. 6. Configured codebook 700 may indicate a list of indices 710 to a user equipment, where each index is associated with one or more of the active SPS occasion resources or resource sets. Thus, when a certain SPS activation indication is decoded from the SPS control channel to result in an activate/deactivate indication code 705, a user equipment may monitor and receive SPS resource occasions according to a resource, or resource set, 710 corresponding to the decode activation/deactivation code 705 that resulted from decoding activation/deactivation indication 605 show in in FIG. 6. A SPS activation indication, indicating NULL or no SPS resource occasions as shown in cell 710D of FIG. 7, may instruct deactivating SPS scheduling for a user equipment or user equipment of a user equipment group (e.g., for a UE or group of UEs corresponding to a given scrambling code).

Figure 7:
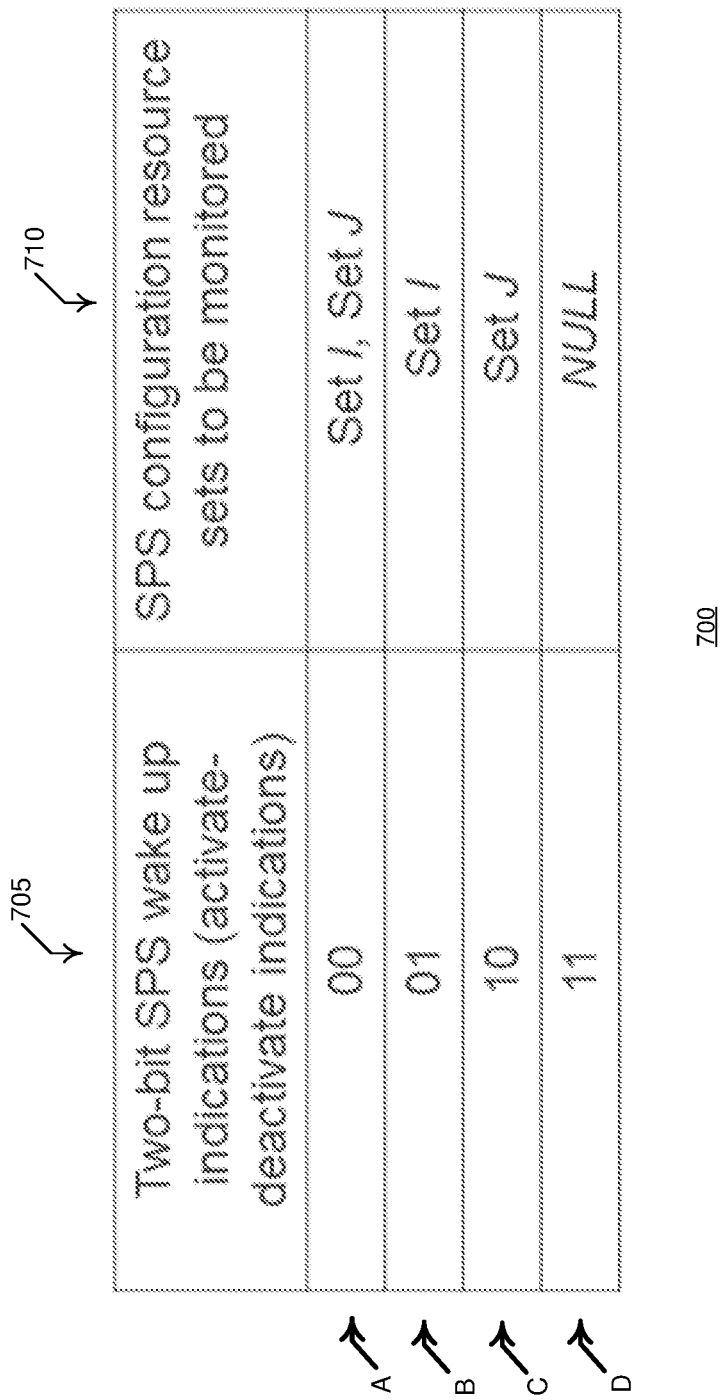
FIG. 7 illustrates configuration information changes based on changes in traffic to be transmitted to a user equipment shown as a codebook table.

In an embodiment, an activate/deactivate indication 605 shown in FIG. 6, in conjunction with a codebook, such as codebook 700 shown in FIG. 7, could instruct a user equipment to deactivate all of occasions 610, 615, 620 and to activate occasions 625 and 630 shown in FIG. 6. It will be appreciated that occasions 610, 615, 620 are shown at different frequency resources than occasions 625 and 630 for purposes of illustration, but all occasions shown in FIG. 6 could be scheduled for the same frequency, or for different frequencies.

In an embodiment, an activate/deactivate indication 605 shown in FIG. 6, in conjunction with a codebook 700, could instruct a user equipment to deactivate less than all of occasions 610, 615, 620 (e.g., only deactivate occasion 615) and to activate less than all of occasions 625 and 630 (e.g., only activate occasion 630). It will be appreciated that for purposes of illustration configured SPS occasions 610, 615, 620 could continue with more occasions at the same period and frequency but that only three occasions are shown in the FIG. 6. Similarly, more than SPS occasions 625 and 630 could be activated by an activate/deactivate indication 605 but only two are shown in FIG. 6 for purpose of illustration.

In an example, indication 605 shown in FIG. 6 could include an indication '1' shown in cell 705D of FIG. 7 that would indicate to a user equipment that has received indication 605 to deactivate SPS occasions 610, 615, 620 without activating other SPS occasions, for example SPS occasions 625 and 630 shown in FIG. 6. Such a scenario may arise, as described above, when a RAN that sends indication 605 has no traffic to deliver to a user equipment receiving and successfully decoding indication 605. Thus, when a RAN determines a change in traffic conditions (e.g., no traffic to deliver to a given UE), the UE need not attempt decoding SPS occasions 610, 615, 620 and thus not waste processor and battery resources on what would be a failed attempt at decoding and receiving traffic.

It will be appreciated that if an activate/deactivate indication 605 comprises instructions to only deactivate configured SPS resources, such an activate/deactivate indication may be viewed as an instruction for a user equipment that receives the activate/deactivate indication to enter a sleep mode if there are no other scheduled occasions to monitor, decode, or otherwise receive downlink traffic from a RAN these transmitted the activate/deactivate indication. Thus, as shown in FIG. 6, activate/deactivate indication 605 may be referred to as an activation/deactivation indication. An activate/deactivate indication may be referred to as a null, or sleep, indication, or an activate/deactivate/null indication, inasmuch as the indication may comprise an instruction for a receiving UE to skip monitoring downlink traffic for certain downlink occasions with the UE being configured to resume monitoring and decoding previously-scheduled SPS resources for downlink traffic data after the certain occasions indicated to be skipped have passed. In an embodiment an activate/deactivate/null indication may comprise an instruction only to deactivate monitoring of a SPS resource. In an embodiment an activate/deactivate/null indication may comprise an instruction only to activate monitoring of a SPS resource.

Figure 8:
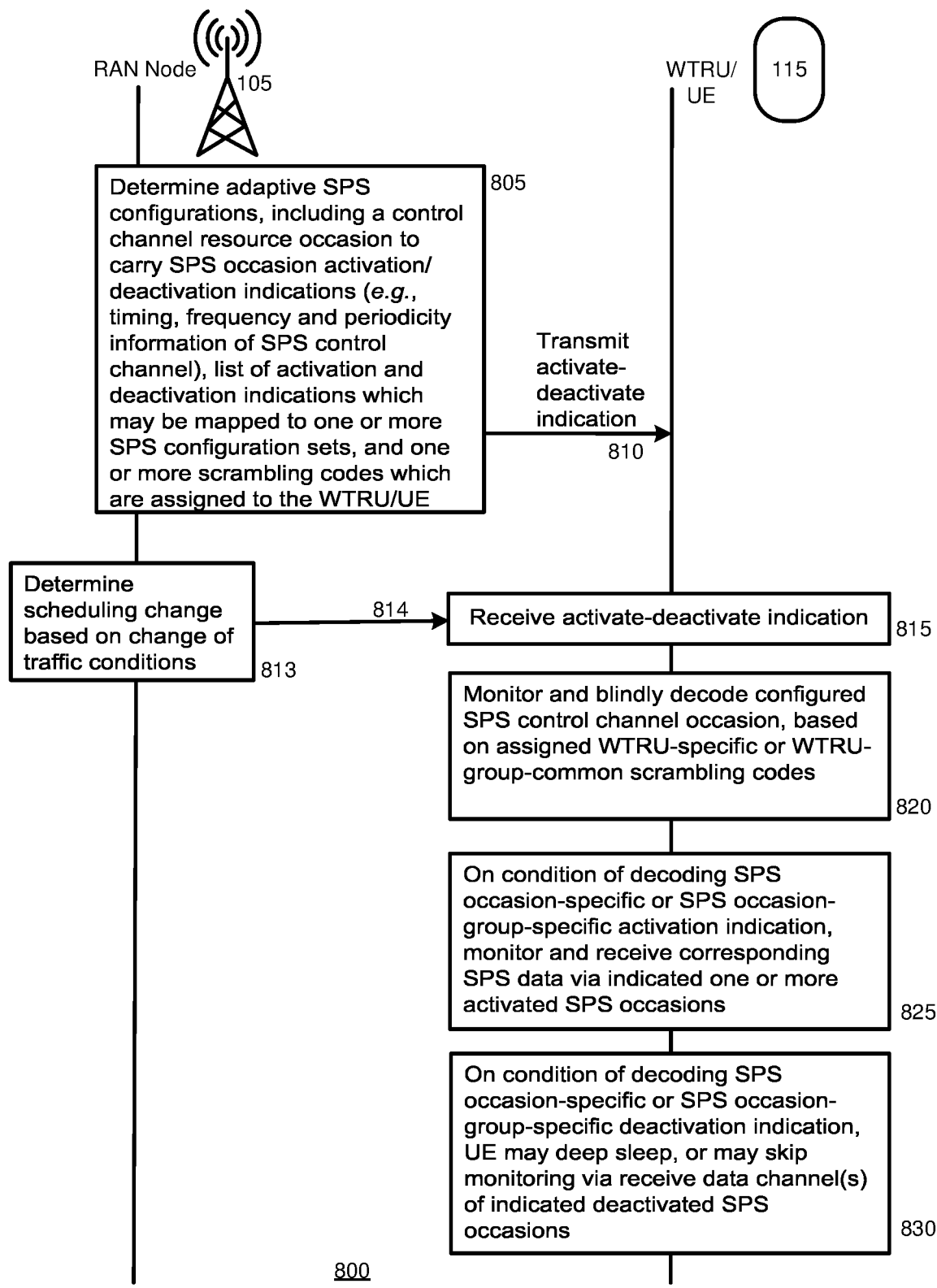
FIG. 8 illustrates a timing diagram of an example method to configure semipersistent schedule resources for a user equipment based on based on changes to traffic to be transmitted to the user equipment.

Turning now to FIG. 8, the figure illustrates timing diagram of an embodiment method 800 to configure a UE 115 with semipersistent schedule resources for a user equipment based on changes to traffic to be transmitted from the RAN to the user equipment. At act 805 RAN 105 determines a SPS configuration that may comprise adaptive activate/deactivate indication configuration information and transmits the SPS configuration generated at act 805 to UE 115 at act 810. An adaptive activate/deactivate SPS configuration may comprise a control channel resource occasion to carry SPS occasion activate/deactivate indications (e.g., timing, frequency and periodicity information of the SPS control channel), a listing of activation and deactivation indications that may be mapped to one or more available SPS configuration sets, and one or more scrambling codes that may be assigned to the UE/WTRU 115. At act 813, RAN 105 determine a change of traffic conditions and determines a scheduling change based on the determined traffic conditions. For example, a change in traffic conditions could comprise a lack, temporary or permanent, of downlink traffic data directed to UE 115 via configured SPS resource occasions. At act 814 RAN 105 transmits an activate/deactivate indication, such as indication 605 shown and described in reference to FIG. 6, to UE 115. Continuing with description of FIG. 8, UE/WTRU 115 receives at act 815 the activate/deactivate indication transmitted at act 814.

At act 820 UE 115 may monitor and decode the configured SPS control channel occasion that may have been configured via the configuration transmitted at act 810, based on a scrambling code corresponding specifically to UE 115 or corresponding specifically to a UE/WTRU group of user equipment of which UE 115 is a member. At act 825, on condition of decoding SPS occasion-specific or SPS occasion-group-specific activate/deactivate indication received at act 815, UE/WTRU 115 may monitor, decode, and receive downlink data via SPS data channels according to one or more activate SPS occasions indicated in the activate/deactivate indication received at act 815 (e.g., UE 115 may monitor, decode, and receive downlink data via occasions 625 and 630 that may have been activated according to activate/deactivate indication 605 as shown in FIG. 6). On condition of decoding SPS occasion-specific or SPS occasion-group-specific activate/deactivate indication received at act 620 indicates that SPS occasions configured by the configuration receive at act 810 should be skipped, UE/WTRU may enter a sleep mode, or otherwise skip monitoring and receiving of downlink data via SPS data channel occasions configured via the configuration received at act 810. It will be appreciated that an activate/deactivate code may be referred to as an activate/deactivate/null indication and may be used to instruct UE 115 to sleep if no traffic directed to the UE is currently buffer at RAN 105.

Figure 9:
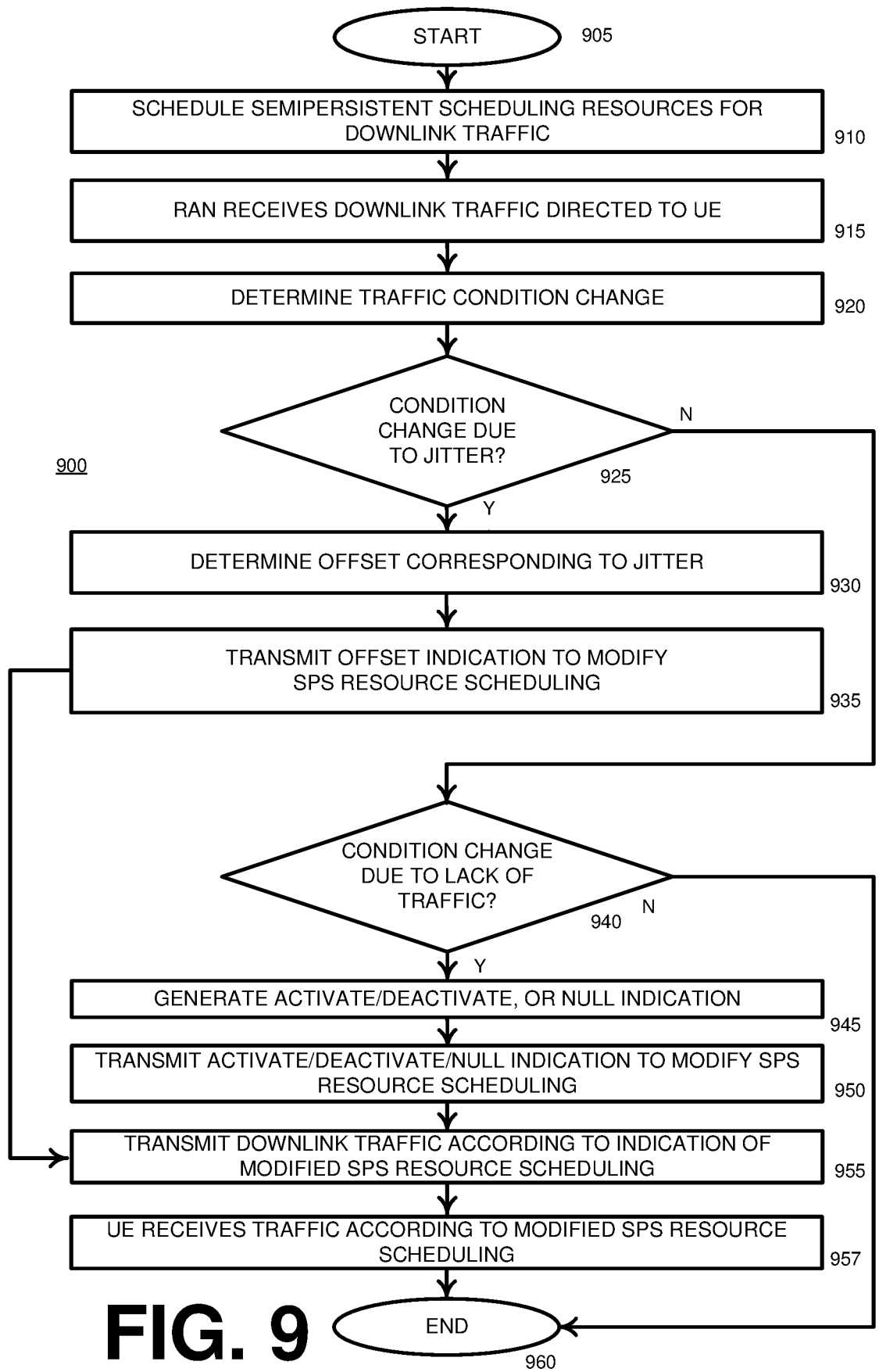
FIG. 9 illustrates a flow diagram of an example method to configure semipersistent schedule resources based on changes of traffic conditions.

Turning now to FIG. 9, the figure illustrates a flow diagram of an embodiment method 900 to configure a UE with semipersistent schedule resources based on a change of a traffic condition, for example jitter, or lack of traffic data to transmit to a user equipment during a scheduled SPS resource occasion. Method 900 begins at act 905. At act 910 a RAN schedules semi persistent scheduling resources for use in transmitting downlink traffic to a user equipment, or a group of user equipment. The scheduling at act 910 may comprise transmitting an SPS configuration to a user equipment, or group of user equipment, as described elsewhere herein. At act 915 the RAN receives downlink traffic, or an indication of downlink traffic, directed to the user equipment, or the group of user equipment. At act 920 the RAN may determine a change of traffic condition. For example, the RAN may determine that a component of a core network, for example network 130 shown in FIG. 1, may have induced jitter into traffic data that is directed to the user equipment, or group of user equipment. In another example, the traffic condition determined at act 920 in FIG. 9 may be that there is no traffic data presently buffered at the RAN to be transmitted to the user equipment, or the group of user equipment.

At act 925 the RAN determines whether the traffic condition change was due to jitter. If the determination made at act 925 is that the traffic condition has caused a potential delay of downlink traffic directed to the user equipment due to jitter, the RAN may determine at act 930 an offset that corresponds to the jitter. The offset may comprise a value in terms of milliseconds, bytes, frames, or other unit of measure, and the offset may be equal to the jitter, or the offset may be different than the jitter. For example, the offset may be slightly longer, or greater, than a delay that may have been caused by jitter. At act 935 the RAN may transmit to the user equipment, or group of user equipment, the offset determined at act 930 in an indication of a scheduling change. The indication of scheduling change, or scheduling change indication, may be encrypted, or encoded, according to a user-equipment-specific, or user-equipment-group-specific, scrambling code, or other type of code that would make the scheduling change indication decodable by the user equipment, or group of user equipment, but not to other user equipment or groups of user equipment. The scrambling code, or other type of code, may be transmitted in a configuration transmitted from the RAN to the user equipment, or group of user equipment, at act 910. The RAN transmits at act 955 downlink traffic directed to the user equipment, or the group of user equipment, according to the scheduling change indication, which indication the user equipment, or group of user equipment, receives and uses to modify, or adjust, semipersistent scheduling resources, which may have been a scheduled according to a configuration transmitted at act 910, to use in receiving traffic at act 957. Method 900 advances to act 960.

Returning to description of act 925, if the determination made it act 925 is that the change of condition determined at act 920 is not due to jitter, method 900 advances to act 940. If a determination is made at act 940 that the change of condition determined at act 920 corresponds to, or is that, no traffic is present at the RAN that is directed to the user equipment, or group of user equipment, to which the configuration transmitted at act 910 was directed, method 900 advances to act 945.

At act 945 the RAN generates an activate/deactivate/ indication. The activate/deactivate/null indication may be scrambled with the device or group specific scrambling code. At act 950 the RAN transmits the activate/deactivate/ null indication to the user equipment, or group of user equipment, for which no downlink traffic is present at the RAN. The user equipment, or group of user equipment, may decode the activate/deactivate/null indication and skip monitoring and decoding of scheduled semi persistent scheduling resources according to the activate/deactivate/null indication. At act 955 the RAN transmits downlink traffic according to the activate/deactivate/null indication. Transmission at act 955 could comprise, for example, not transmitting downlink traffic data to the user equipment if the change of condition of traffic determined at act 920 is that there is no downlink traffic to transmit to the user equipment, or group of user equipment. If the activate/deactivate/null indication indicates that certain configured semipersistent scheduling resources are to be deactivated but not all semipersistent scheduling resources are to be deactivated then the RAN transmits downlink traffic data accordingly. If the activate/deactivate/null indication generated at act 945 and transmitted at act 950 indicates to the intended user equipment, or group of user equipment, that certain currently scheduled semipersistent scheduling resources should be deactivated and other, not already scheduled, semipersistent scheduling resources should be activated, the transmitting of traffic at act 955 may comprise transmitting downlink traffic data during the newly activated semi persistent scheduling resources but not transmitting downlink data during the newly deactivated semi persistent scheduling resources. Method 900 ends at act 960.

Figure 10:
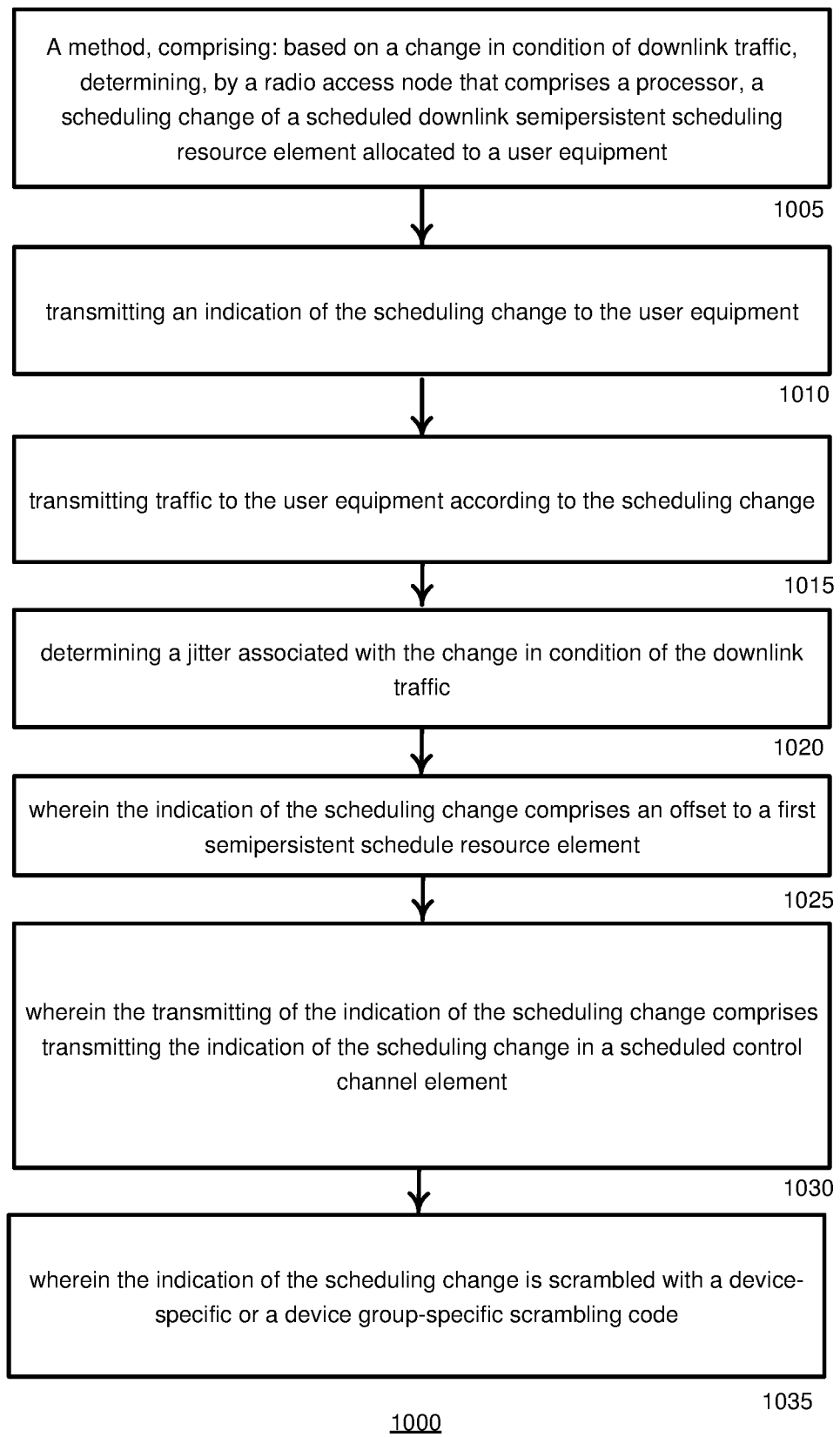
FIG. 10 illustrates a block diagram of an example method.

Turning now to FIG. 10, the figure illustrates an example embodiment method 1000 comprising at block 1005, based on a change in condition of downlink traffic, determining, by a radio access node that comprises a processor, a scheduling change of a scheduled downlink semipersistent scheduling resource element allocated to a user equipment; at block 1010 transmitting an indication of the scheduling change to the user equipment; at block 1015 transmitting traffic to the user equipment according to the scheduling change; at block 1020 determining a jitter associated with the change in condition of the downlink traffic; at block 1025 wherein the indication of the scheduling change comprises an offset to a first semipersistent schedule resource element; at block 1030 wherein the transmitting of the indication of the scheduling change comprises transmitting the indication of the scheduling change in a scheduled control channel element; and at block 1035 wherein the indication of the scheduling change is scrambled with a device-specific or a device group-specific scrambling code.

Figure 11:
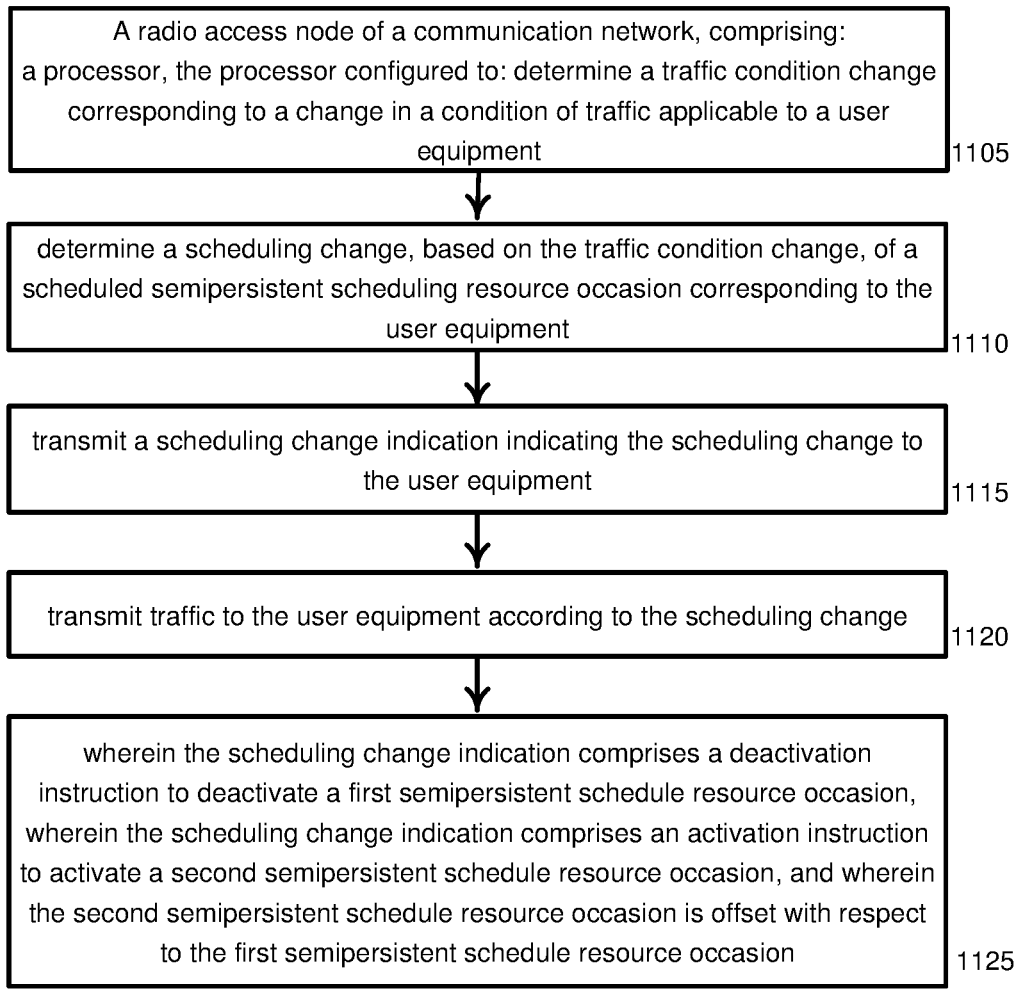
FIG. 11 illustrates a block diagram of an example user equipment.

Turning now to FIG. 11, the figure illustrates an example system 1100, comprising at block 1105 a radio access node of a communication network, comprising a processor, the processor configured to: determine a traffic condition change corresponding to a change in a condition of traffic applicable to a user equipment; at block 1110 determine a scheduling change, based on the traffic condition change, of a scheduled semipersistent scheduling resource occasion corresponding to the user equipment; at block 1115 transmit a scheduling change indication indicating the scheduling change to the user equipment; at block 1120 transmit traffic to the user equipment according to the scheduling change; and at block 1125 wherein the scheduling change indication comprises a deactivation instruction to deactivate a first semipersistent schedule resource occasion, wherein the scheduling change indication comprises an activation instruction to activate a second semipersistent schedule resource occasion, and wherein the second semipersistent schedule resource occasion is offset with respect to the first semipersistent schedule resource occasion.

Figure 12:
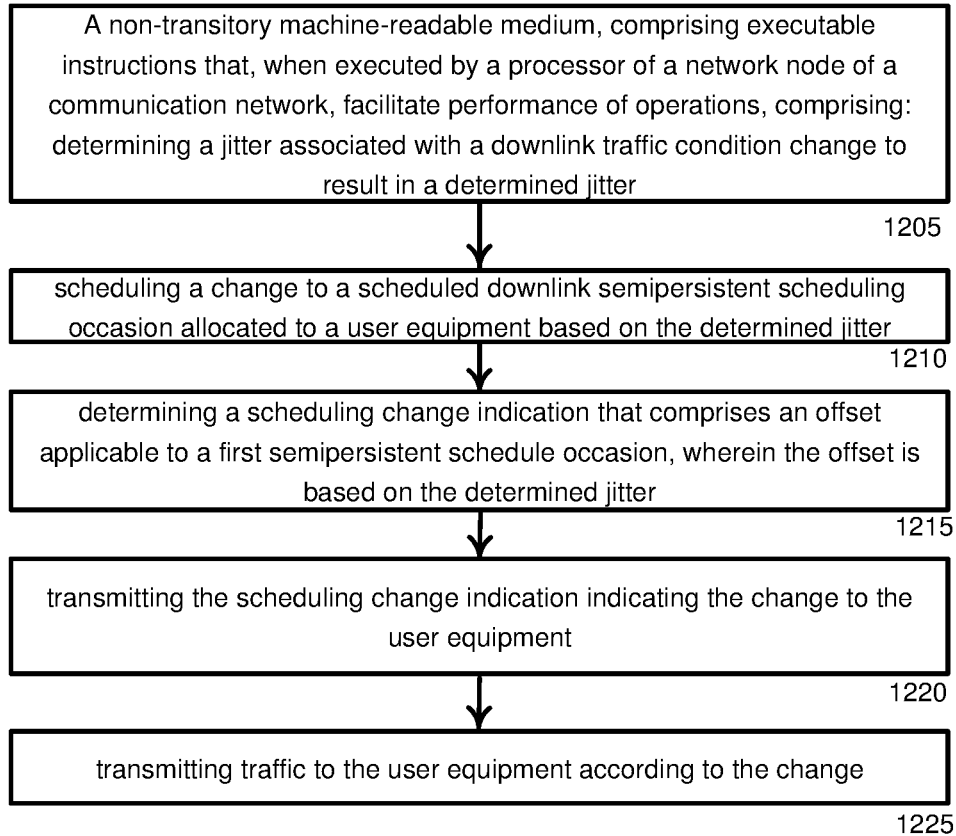
FIG. 12 illustrates a block diagram of an example non-transitory machine-readable medium.

Turning now to FIG. 12, the figure illustrates a non-transitory machine-readable medium 1200 comprising at block 1205 executable instructions that, when executed by a processor of a network node of a communication network, facilitate performance of operations, comprising: determining a jitter associated with a downlink traffic condition change to result in a determined jitter; at block 1210 scheduling a change to a scheduled downlink semipersistent scheduling occasion allocated to a user equipment based on the determined jitter; at block 1215 determining a scheduling change indication that comprises an offset applicable to a first semipersistent schedule occasion, wherein the offset is based on the determined jitter; at block 1220 transmitting the scheduling change indication indicating the change to the user equipment; and at block 1225 transmitting traffic to the user equipment according to the change.

Figure 13:
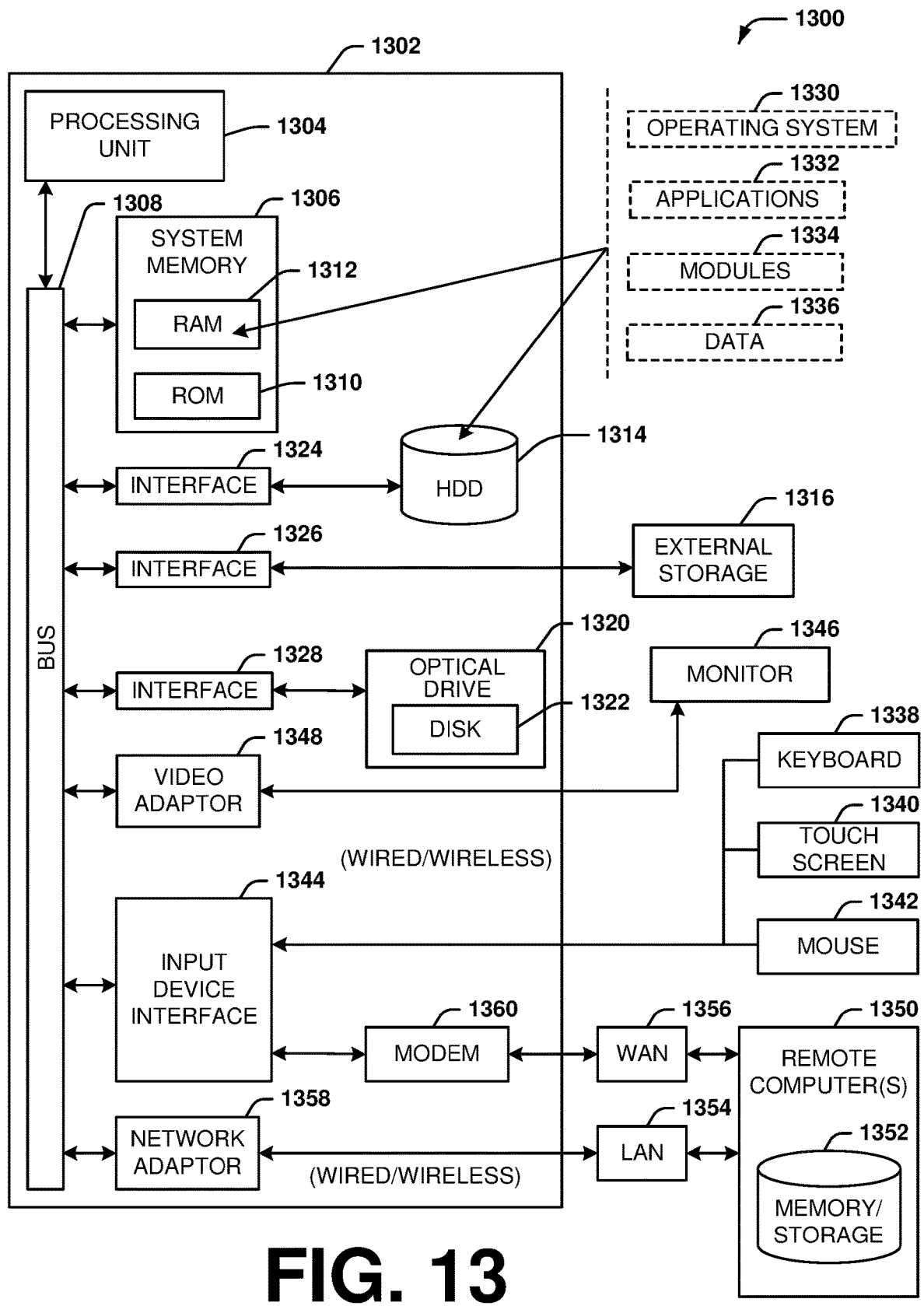
FIG. 13 illustrates an example computer environment.

In order to provide additional context for various embodiments described herein, FIG. 13 and the following discussion are intended to provide a brief, general description of a suitable computing environment 1300 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors and may include a cache memory. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

Computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid-state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can comprise a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
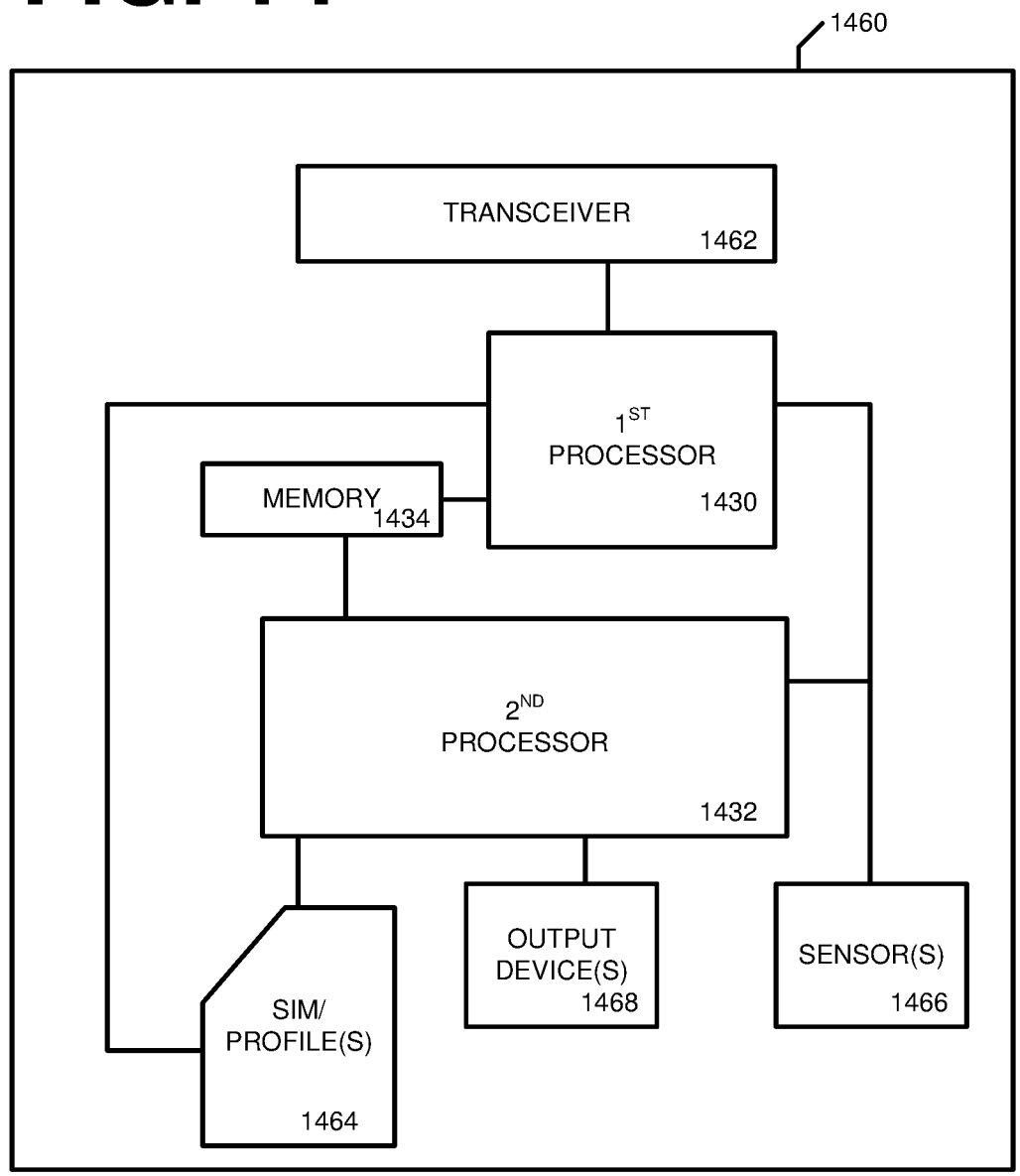
FIG. 14 illustrates a block diagram of an example wireless UE.

Turning to FIG. 14, the figure illustrates a block diagram of an example UE 1460. UE 1460 may comprise a smart phone, a wireless tablet, a laptop computer with wireless capability, a wearable device, a machine device that may facilitate vehicle telematics, a tracking device, remote sensing devices, and the like. UE 1460 comprises a first processor 1430, a second processor 1432, and a shared memory 1434. UE 1460 includes radio front end circuitry 1462, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1462 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 14, UE 1460 may also include a SIM 1464, or a SIM profile, which may comprise information stored in a memory (memory 34 or a separate memory portion), for facilitating wireless communication with RAN 105 or core network 130 shown in FIG. 1. FIG. 14 shows SIM 1464 as a single component in the shape of a conventional SIM card, but it will be appreciated that SIM 1464 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1464 and another device, which may be a component of RAN 105 or core network 130 shown in FIG. 1). A SIM profile 1464 may also comprise identifying information that is unique to the SIM, or SIM profile, such as, for example, an International Mobile Subscriber Identity ("IMS") or information that may make up an IMSI.

SIM 1464 is shown coupled to both the first processor portion 1430 and the second processor portion 1432. Such an implementation may provide an advantage that first processor portion 30 may not need to request or receive information or data from SIM 1464 that second processor 1432 may request, thus eliminating the use of the first processor acting as a 'go-between' when the second processor uses information from the SIM in performing its functions and in executing applications. First processor 1430, which may be a modem processor or a baseband processor, is shown smaller than processor 1432, which may be a more sophisticated application processor, to visually indicate the relative levels of sophistication (i.e., processing capability and performance) and corresponding relative levels of operating power consumption levels between the two processor portions. Keeping the second processor portion 1432 asleep/inactive/in a low power state when UE 1460 does not need it for executing applications and processing data related to an application provides an advantage of reducing power consumption when the UE only needs to use the first processor portion 1430 while in listening mode for monitoring routine configured bearer management and mobility management/maintenance procedures, or for monitoring search spaces that the UE has been configured to monitor while the second processor portion remains inactive/asleep.

UE 1460 may also include sensors 1466, such as, for example, temperature sensors, accelerometers, gyroscopes, barometers, moisture sensors, and the like that may provide signals to the first processor 1430 or second processor 1432. Output devices 1468 may comprise, for example, one or more visual displays (e.g., computer monitors, VR appliances, and the like), acoustic transducers, such as speakers or microphones, vibration components, and the like. Output devices 1468 may comprise software that interfaces with output devices, for example, visual displays, speakers, microphones, touch sensation devices, smell or taste devices, and the like, that are external to UE 1460.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| QCI | QoS Class Identifiers |
| BSR | Buffer status report |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    determining, by a radio access node that comprises at least one processor, a jitter associated with a change in condition of downlink traffic;
    based on the jitter associated with the change in the condition of the downlink traffic, determining, by the radio access node, a scheduling change of a scheduled downlink semipersistent scheduling resource element allocated to a user equipment;
    transmitting an indication of the scheduling change to the user equipment, wherein the indication of the scheduling change comprises an offset to a first semipersistent schedule resource element, and wherein the transmitting of the indication of the scheduling change comprises transmitting the indication of the scheduling change in a codebook of at least one jitter indication indicating at least one semipersistent schedule time offset and at least one corresponding semipersistent schedule resource element; and
    transmitting traffic to the user equipment according to the scheduling change.

2. The method of claim 1, wherein the offset comprises a time offset.

3. The method of claim 1, wherein the offset comprises a frequency offset.

4. The method of claim 1, wherein the transmitting of the indication of the scheduling change further comprises transmitting the indication of the scheduling change in a scheduled control channel element.

5. The method of claim 1, wherein the indication of the scheduling change comprises a deactivation instruction to deactivate the first semipersistent schedule resource element, wherein the indication of the scheduling change comprises an activation instruction to activate a second semipersistent schedule resource element, and wherein the second semipersistent schedule resource element is offset with respect to the first semipersistent schedule resource element.

6. The method of claim 1, wherein the indication of the scheduling change is scrambled with a device-specific or a device group-specific scrambling code.

7. The method of claim 1, wherein the indication of the scheduling change comprises a no-traffic indication corresponding to a null scheduled semipersistent schedule resource element indicating that the user equipment is to refrain from decoding the null scheduled semipersistent scheduling element.

8. The method of claim 7, wherein the indication of the scheduling change indicates only to refrain from decoding the null scheduled semipersistent schedule resource element of multiple scheduled semipersistent schedule resource elements.

9. The method of claim 1, wherein the indication of the scheduling change is scrambled according to a device-specific semipersistent scheduling scrambling code or sequence or a device-group-specific semipersistent scheduling scrambling code or sequence.

10. A radio access node of a communication network, comprising:
    a processor, the processor configured to:
        determine a traffic condition change corresponding to a change in a condition of traffic applicable to a user equipment;
        determine a scheduling change, based on the traffic condition change, of a scheduled semipersistent scheduling resource occasion corresponding to the user equipment;
        transmit, to the user equipment, a codebook comprising a scheduling change indication indicating the scheduling change and at least one corresponding jitter indication indicative of a semipersistent schedule time offset and at least one corresponding semipersistent schedule resource element; and
        transmit traffic to the user equipment according to the scheduling change.

11. The radio access node of claim 10, wherein the processor is further configured to:
    determine a jitter associated with the traffic condition change to result in a determined jitter,
    wherein the scheduling change indication is indicative of an offset to a first semipersistent schedule resource occasion, wherein the offset corresponds to the determined jitter.

12. The radio access node of claim 11, wherein the scheduling change indication comprises a deactivation instruction to deactivate a first semipersistent schedule resource occasion, wherein the scheduling change indication comprises an activation instruction to activate a second semipersistent schedule resource occasion, and wherein the second semipersistent schedule resource occasion is offset with respect to the first semipersistent schedule resource occasion.

13. The radio access node of claim 11, wherein the codebook further comprises a jitter indication configuration, and
    wherein the scheduling change indication comprises a jitter indication to be used by the user equipment to determine, from the jitter indication configuration, a semipersistent schedule timing offset of the at least one corresponding semipersistent schedule timing offset to result in a determined semipersistent schedule timing offset to be used to process downlink traffic received from the radio access node.

14. The radio access node of claim 10, wherein the scheduling change indication comprises a no-traffic indication corresponding to a null scheduled semipersistent scheduling resource occasion instructing the user equipment not to attempt to decode the null scheduled semipersistent scheduling resource occasion.

15. The radio access node of claim 14, wherein the scheduling change indication further comprises an indication of multiple upcoming semipersistent scheduling resource occasions to be used by the user equipment to receive future downlink traffic.

16. A non-transitory machine-readable medium, comprising executable instructions that, when executed by a processor of a network node of a communication network, facilitate performance of operations, comprising:
    transmitting a codebook that comprises at least one scheduling change indication indicative of at least one scheduling change and at least one jitter indication indicating a semipersistent schedule time offset and at least one corresponding semipersistent schedule resource element;
    determining a jitter associated with a downlink traffic condition change to result in a determined jitter;
    scheduling a change to a scheduled downlink semipersistent scheduling occasion allocated to a user equipment based on the determined jitter;
    determining a scheduling change indication that, in the codebook, corresponds to an offset applicable to a first semipersistent schedule occasion to result in a determined scheduling change indication, wherein the offset is based on the determined jitter;

transmitting, to the user equipment, the determined scheduling change indication indicating the change; and transmitting traffic to the user equipment according to the change.

17. The non-transitory machine-readable medium of claim 16, wherein the determined scheduling change indication is anonymized using a device-specific code or a device group-specific scrambling code.

18. The non-transitory machine-readable medium of claim 16, wherein the scheduling change indication comprises a deactivation instruction to deactivate the first semipersistent schedule occasion, wherein the scheduling change indication further comprises an activation instruction to activate a second semipersistent schedule occasion, and wherein the second semipersistent schedule occasion is offset with respect to the first semipersistent schedule occasion based on the offset.

19. The radio access node of claim 10, wherein the scheduling change indication is anonymized using a device-specific code or a device group-specific scrambling code.

20. The non-transitory machine-readable medium of claim 18, wherein the first semipersistent schedule occasion is a current semipersistent schedule occasion that corresponds to a first semipersistent schedule occasion set, wherein the second semipersistent schedule occasion corresponds to a second semipersistent schedule occasion set, and wherein the second semipersistent schedule occasion is scheduled to occur before a next schedule occasion corresponding to the first semipersistent schedule occasion set.

\* \* \* \* \*